UNITED STATES PATENT OFFICE.

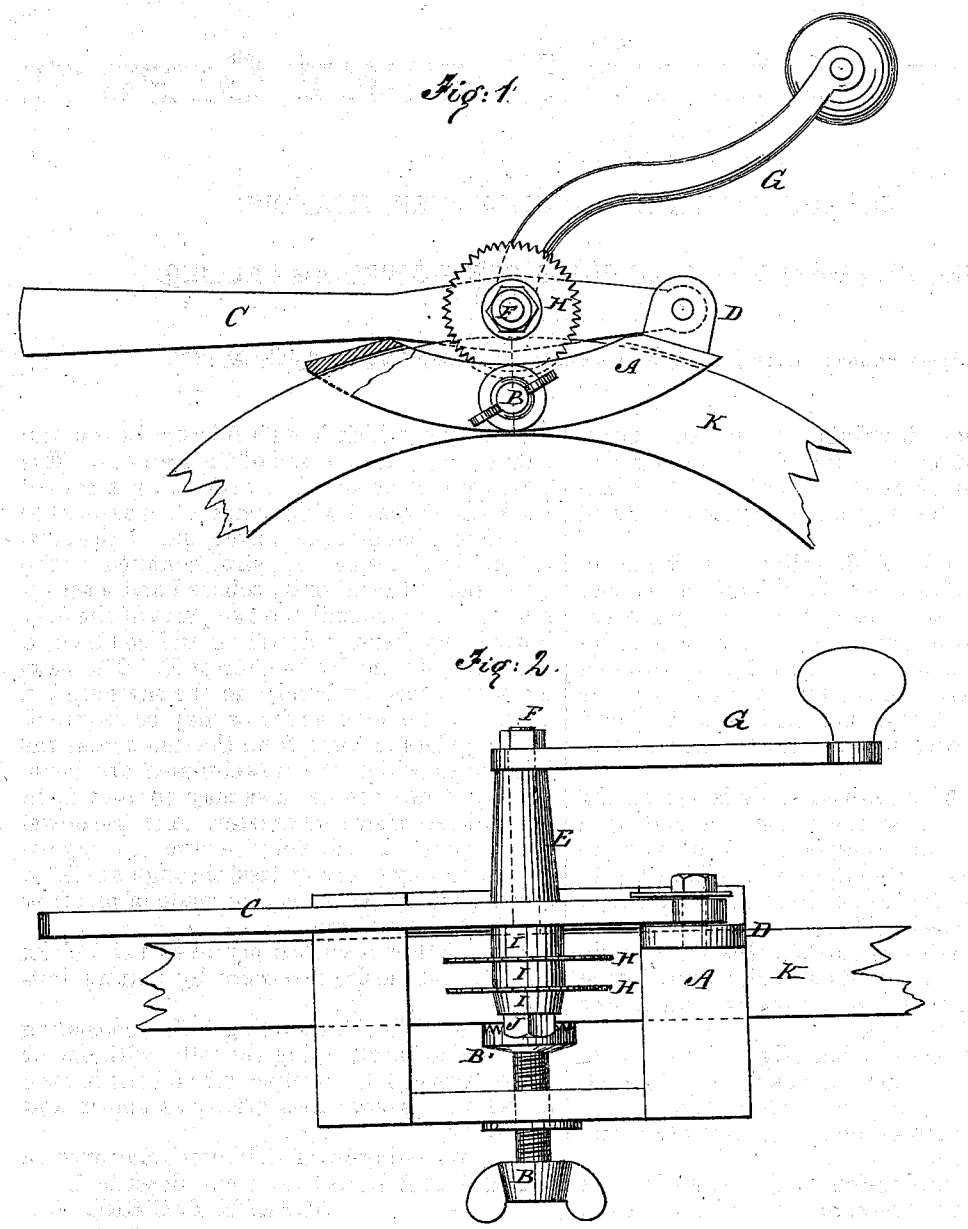

JOSEPH P. O'BRIEN, OF KEWANEE, ILLINOIS.

IMPROVEMENT IN MACHINES FOR DOWELING FELLIES.

Specification forming part of Letters Patent No. 129,979, dated July 30, 1872.

Specification describing a new and useful Improvement in Machines for Doweling Fellies, invented by JOSEPH P. O'BRIEN, of Kewanee, in the county of Henry and State of Illinois.

The old mode of doweling the fellies of wheeled vehicles was to bore a hole in the end of each of the sections of the felly which were to form the joint and insert the dowel-pin into one of the holes and then drive the two sections together. The ends of the two sections would thus butt together and form the joint, while the dowel would prevent any lateral movement.

The later and improved mode is to butt the two ends of the sections together and then make one or more slots or kerfs with a circular saw across the joint, and introduce a thin piece of metal into such slot, which the tire of the wheel holds in place.

My machine is designed for this latter mode of doweling; and consists in clamping device and saws arranged to operate as hereinafter set forth and described.

In the annexed drawing, Figure 1 represents a side view of the machine as applied to a felly. Fig. 2 is a top view of the same.

Similar letters of reference indicate corresponding parts.

A is the clamping-frame, the form of which is represented in the side and top views of the drawing. B is a clamp-screw working in a screw-thread through the side of the frame, having a loose clamp-disk, B', upon its end. C is a lever, which has its fulcrum in the projecting lug D at one end of the frame A. E is a sleeve-box attached to or forming a part of the lever, through which passes the saw-arbor F. G is a hand-crank on the end of the saw-arbor. H H are circular saws confined on the outer end of the arbor by collars I and a screw-nut, J. K represents the two parts of the felly butted together for doweling and confined in the clamp-frame by the screw B. The saw-arbor is turned by hand, and the saws are fed down by the lever as far as may be required, making slots or kerfs from the top across the joint, into which the dowel-plates are introduced. One or more saws may be used, as in light wheels of small diameter. A single dowel is sufficient. The dowel (one or more) may extend half way (more or less) through the felly, and the dowel-plate may be made of metal or any suitable material.

Having thus described my invention, I claim as new and desire to secure by Letters Patent—

1. A machine for doweling fellies, consisting of a device for clamping the felly, with one or more saws connected therewith for sawing the dowel-plate slots, substantially as shown and described.

2. The feeding-lever C, in combination with the saw-arbor E, as shown and described.

JOSEPH P. O'BRIEN.

Witnesses:
WASHINGTON M. ELLIOTT,
MORTIMER O'SULLIVAN.